United States Patent [19]

Chou

[11] Patent Number: 5,332,262

[45] Date of Patent: Jul. 26, 1994

[54] AUTOMOBILE SAFETY BELT DEVICE

[76] Inventor: Hung-Tu Chou, No. 62, Chin Hsueh Road, Shan Hua Chen, Tainan Hsien, Taiwan

[21] Appl. No.: 42,773

[22] Filed: Apr. 6, 1993

[51] Int. Cl.⁵ .............................................. B06R 22/42
[52] U.S. Cl. ..................................... 280/806; 180/282; 297/478; 297/480
[58] Field of Search ............... 280/806, 807, 803; 180/282, 268; 297/478, 480, 476

[56] References Cited

U.S. PATENT DOCUMENTS

| | | | |
|---|---|---|---|
| 4,838,499 | 6/1989 | Föhl | 280/806 |
| 5,007,661 | 4/1991 | Lenzen | 280/806 |
| 5,275,437 | 1/1994 | Mödinger et al. | 280/806 |

FOREIGN PATENT DOCUMENTS

| | | | |
|---|---|---|---|
| 3341568 | 5/1985 | Fed. Rep. of Germany | 280/806 |
| 2620669 | 3/1989 | France | 280/806 |
| 8901430 | 2/1989 | World Int. Prop. O. | 280/806 |

*Primary Examiner*—Brian L. Johnson
*Assistant Examiner*—Paul N. Dickson
*Attorney, Agent, or Firm*—Morton J. Rosenberg; David I. Klein

[57] ABSTRACT

An automobile safety belt device includes a retract unit for stopping a safety belt from lengthening by using a motor which pulls a rope to move an adjusting wheel nearer two fixing wheels in the retract unit for pinching immovable the safety belt in case of a shock caused by an accident or an urgent stepping on a brake.

3 Claims, 6 Drawing Sheets

AUTOMOBILE SAFETY BELT DEVICE

BACKGROUND OF THE INVENTION

A conventional automobile safety belt device shown in FIG. 7 includes a belt housing 71, a safety belt 72, a fixing member 73, a retaining member 74, a hook 75 and a hook retainer 76.

The belt housing 71 fixed on a post 77, the fixing member 73 is mounted a wall near the belt housing 71 for the safety belt to pass through to go into the housing 71. The retaining member 74 is mounted on a rear portion of a seat to retain an outer end of the safety belt 72 and the hook retainer engages the hook 75 engages the hook 75. Then the safety belt 72 is placed on the body of a driver or a person, inserting the hook 75 in the hook retainer for preventing the body of a user from suddenly inclining forward in a shock.

This conventional safety belt has drawbacks in practical use as follows:

1. In case of a shock the body receives, the safety belt can be extended by movement of the body, and the safety belt can be pinched to stop lengthening by the belt device mechanism. But there is a time delay between the two separate actions to result in possible forward inclination of the body to bumo with a steering wheel, a gauge panel or a wind shield.

2. The neck of a user may hurt by fierce swing caused by the safety belt not yet stopped because of the time delay, even if there is a safety balloon provided in a car to protect the head of a user.

3. In case the backrest is tilted backward for comfort by a user, the safety belt become longer than it should be by the increased angle of the backrest, hardly protective in an accident.

SUMMARY OF THE INVENTION

This invention has been devised to offer an automobile safety belt device having features as follows.

1. It has a safety belt possible to be kept properly placed on the body of a user, not too loose, even if a backrest is inclined back a little for comfort.

2. It includes a retract unit to stop the safety belt placed on the body of a user from lengthening out of a belt housing in case of a shock or urgent stepping on a brake, preventing the body of the user from inclining forward to bump the steering wheel, the gauge panel or the wind shield of a car.

3. When it is used together with a safety balloon, the retract unit can quickly stop the safety belt before the body of a user moves to bump the safety balloon, preventing the body from excessive inclination or the neck from being hurt.

4. It has a motor to be started by a plurality of automatic shock sensors to pull a rope to actuate the retract unit to stop the safety belt in case of a shock, and related components for arprotect the body of a user.

BRIEF DESCRIPTION OF DRAWINGS

The invention will be better understood by reference to the accompanying drawings, wherein.

DESCRIPTION OF THE PREFERRED EMBODIMENTS

Figure 1:
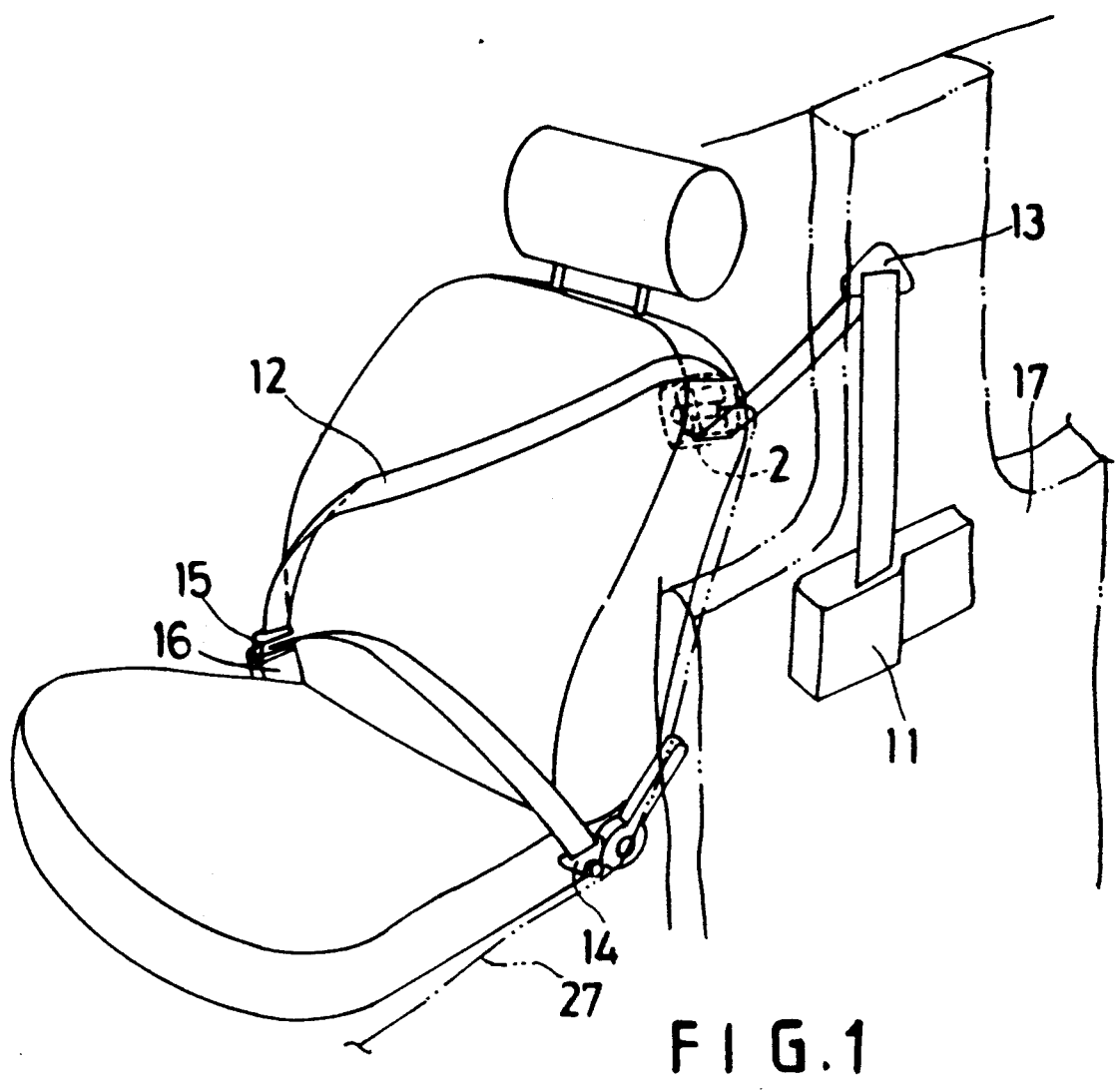
FIG. 1 is a perspective view of an automobile safety belt device in the present invention.

An automobile safety belt device in the present invention, as shown in FIGS. 1-4, includes a belt housing 11, a safety belt 12, a fixing member 14, a retaining member 13, a hook 15, a hook retainer 16, a retract unit 2, a motor 3, and a plurality of automatic sensors 4.

The belt housing 11 is fixed on a post 17 in an automobile, the retaining member 13 is fixed on an upper wall near the post 17 and the fixing member 14 is fixed on an outer side surface of a driver's seat. The hook retainer 16 is fixed on an inner side surface of the driver's seat, and the retract unit 2 is fixed on an upper portion of a backrest of the seat.

Figure 2:
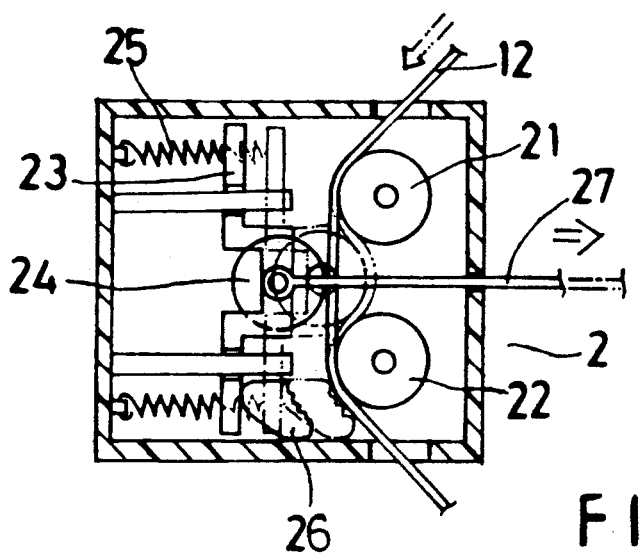
FIG. 2 is a structural view of a belt retract device in the automobile safety belt device in the present invention.
Figure 3:
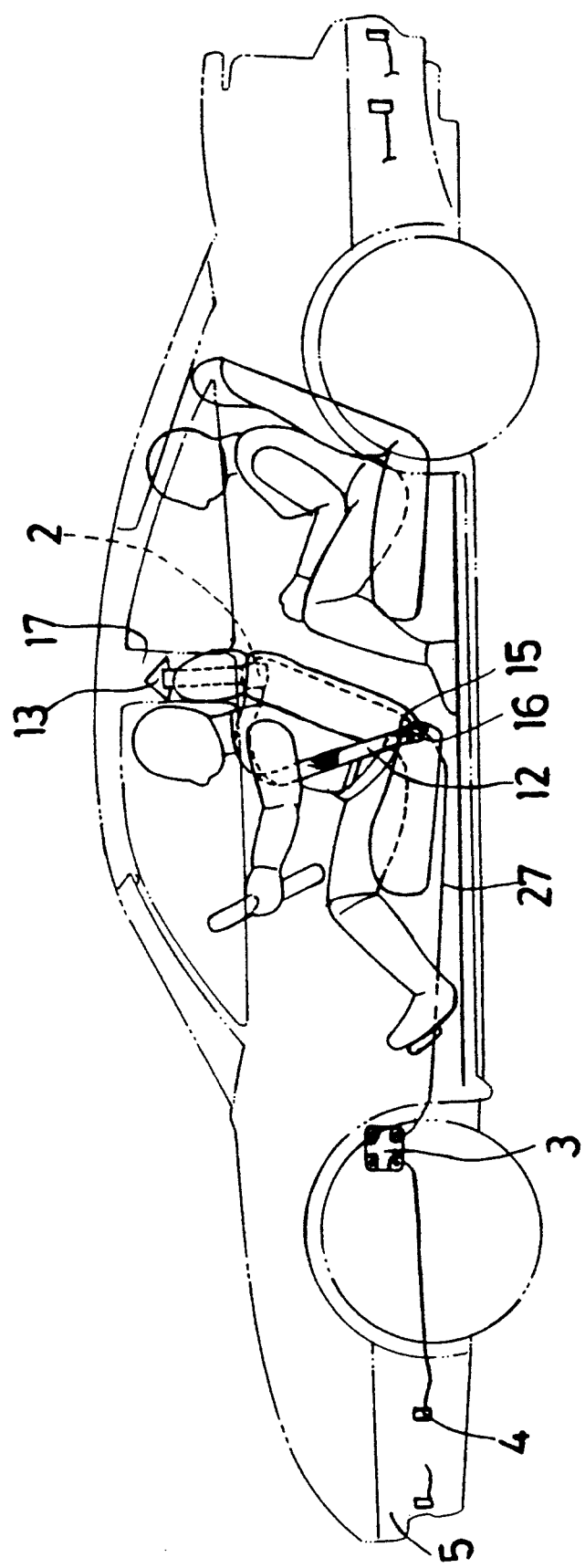
FIG. 3 is a view of a position of automatic sensors in the present invention.
Figure 4:
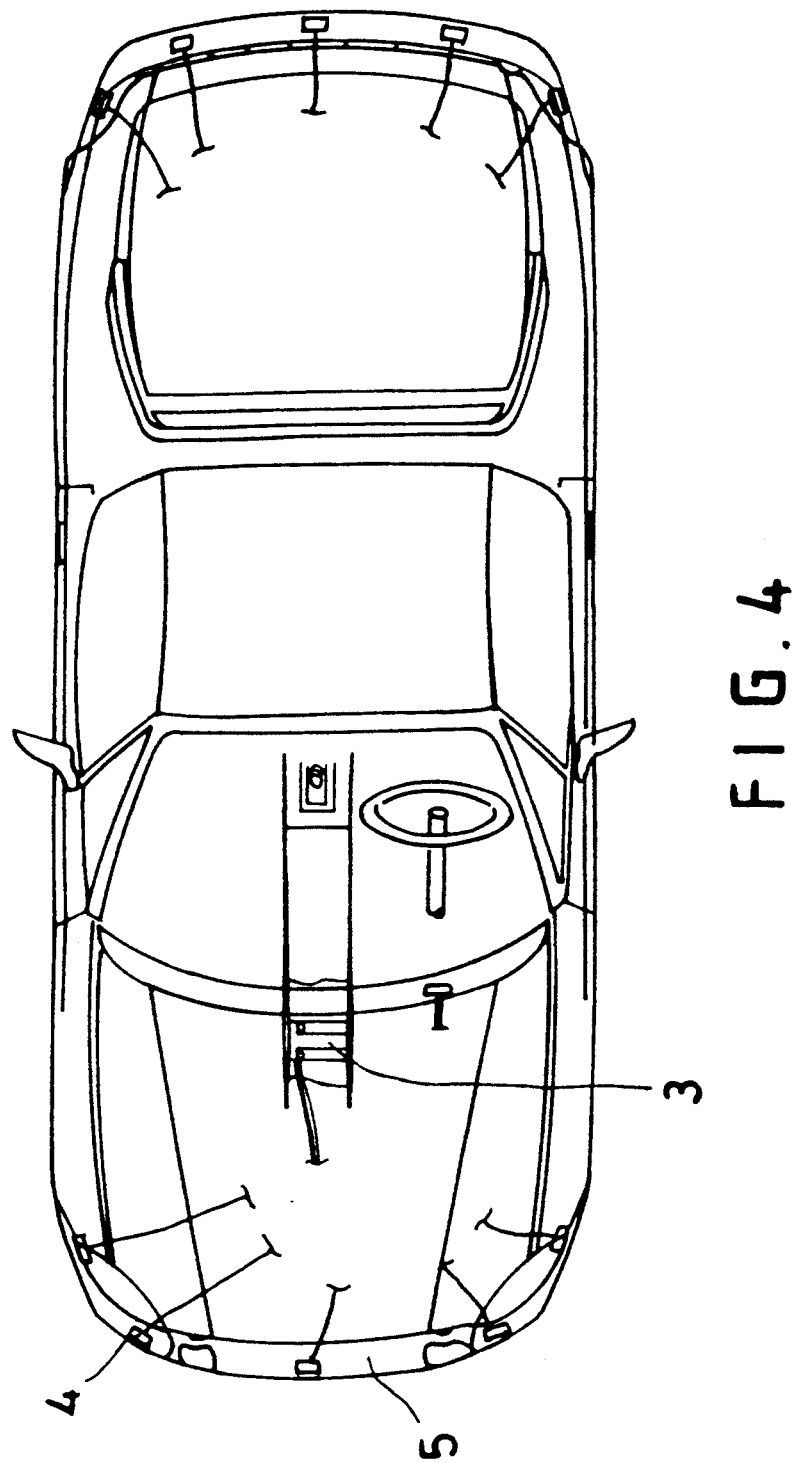
FIG. 4 is a view of another position of the automatic sensors in the present invention.
Figure 5:
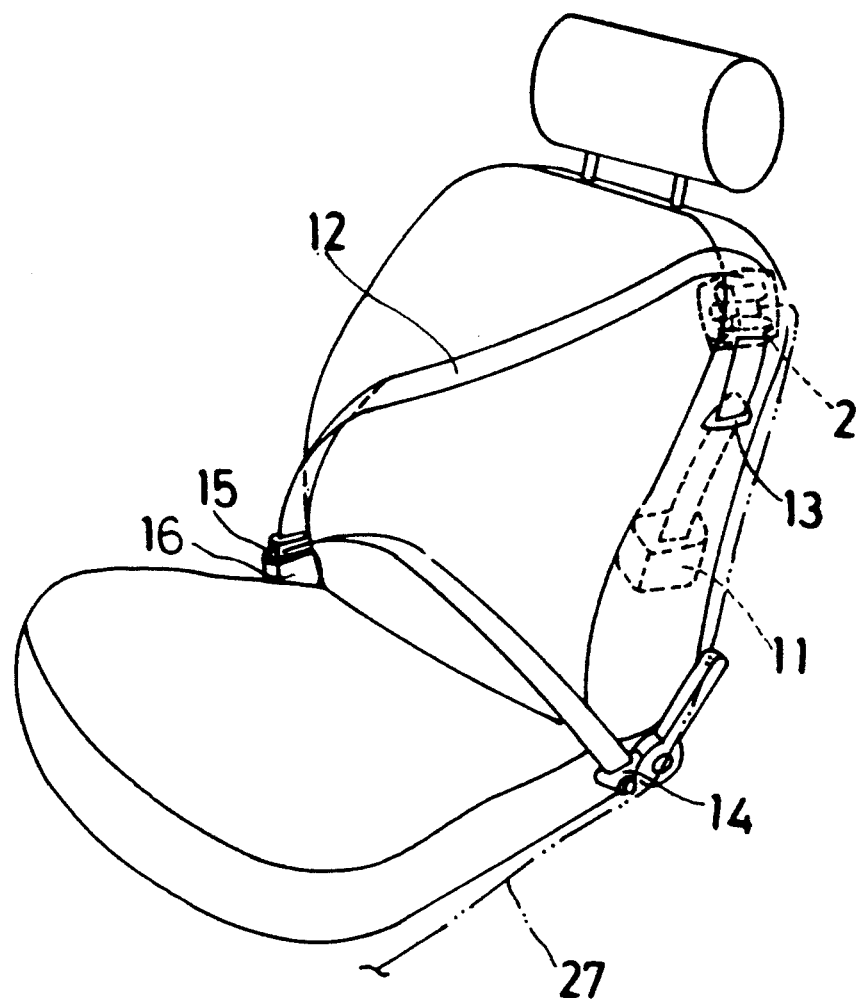
FIG. 5 is a perspective view of a second embodimen of the automobile safety belt device in the present invention.
Figure 6:
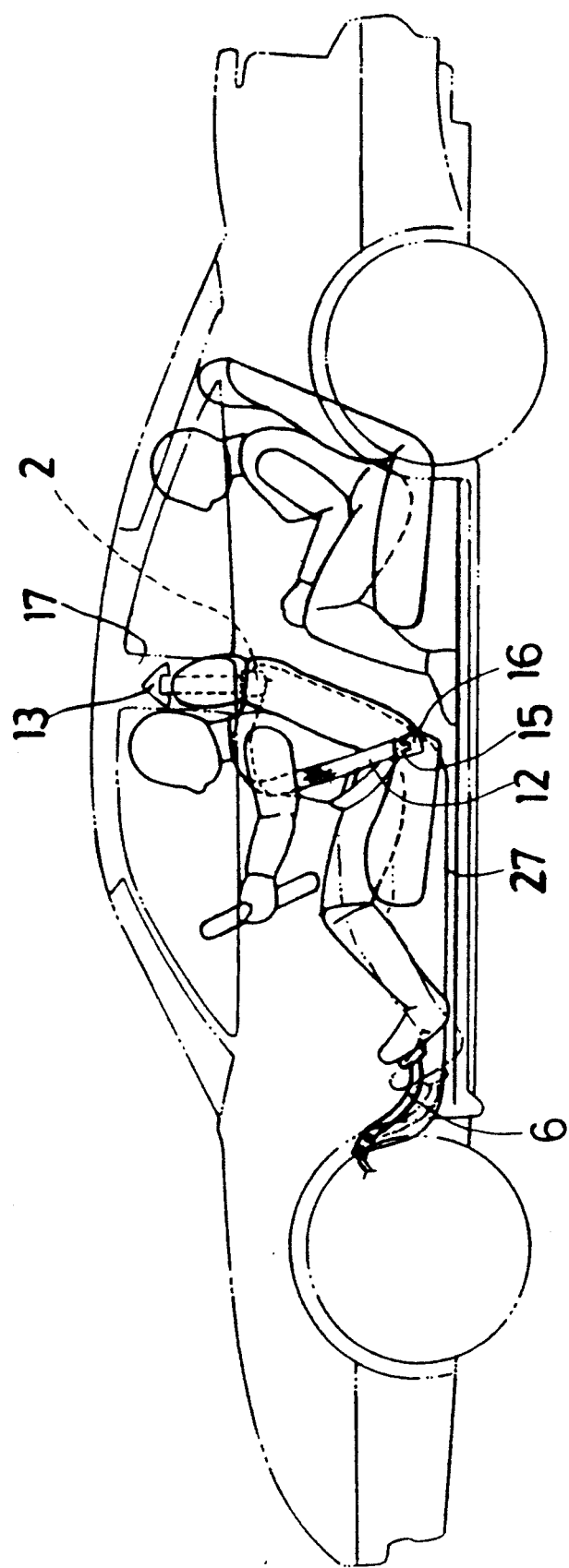
FIG. 6 is a view of the position of the second embodiment of the automobile safety device in the present invention; and, FIG. 7 is a perspective view of a conventional automobile safety belt device.
Figure 7:
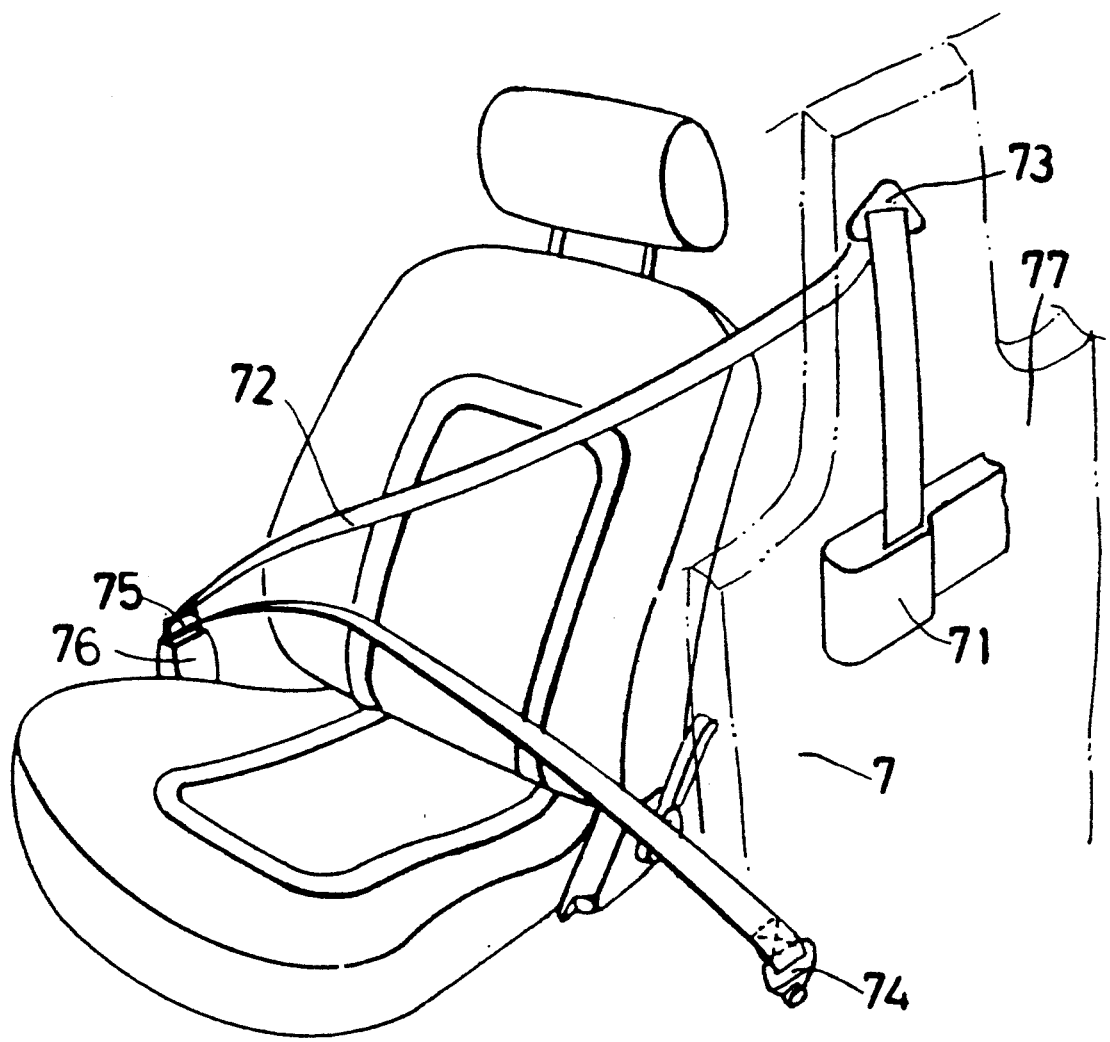

The retract unit 2, as shown in FIG. 2, consists of two fixing wheels 21, 22, a double bent connecting rod 23, an adjusting wheel 24, two coil springs 25, 25, and a block 26. The two fixing wheels 21, 22 are arranged in a vertical line, spaced properly apart and the adjusting wheel 24 is fixed on the connecting rod 23, located beside and between the two fixing wheels 21, 22. Then the safety belt 12 passes through a passageway formed by the two fixing wheels 21, 22 and the adjusting wheel 24, coming out of the belt housing 11. The connecting rod 23 has its two ends fixed with an end of the two coil springs 25, 25, which have the other ends hooked with a side wall of a case of the unit 2. A pull rope 27 is stretched between the adjusting wheel 24 and the motor 3. A plurality of automatic sensors 4 are set on a front and a rear bumper, connected with the motor 3, as shown in FIGS. 3 and 4. And a stop block 26 is provided under one end of the connecting rod 23.

As the fixing member 14 and the hook retainer 16 are mounted on both rear sides of the seat and the lower sides of the backrest, the belt 12 may be adequately placed on the body of a driver or a rider, properly pulled by the retract unit 2 mounted on the backrest, even if the backrest should be rested upon by a person to incline back a little.

In an accident, the front or the rear bumper sensors would sense the shock and funtcion to start the motor 3, which then rotates to pull the rope 27 so that the adjusting wheel 24 is pulled to move nearer the two fixing wheels 21, 22, and the stop block 26 pushes the safety belt 12 against the wheel 22 so that the safety belt 12 may be pinched immovable between the adjusting wheel 24 and the two fixing wheels 21, 22. Therefore, the safety belt 12 can prevent the body of the driver or the rider from suddenly inclining forward and getting wounded or hurt.

The belt housing 11 can also be mounted inside a vertical side of the backrest, the fixing member 13 being fixed on an upper portion of the vertical side of the backrest. Then the belt 12 can also be placed closely on the body of a user, no matter how the backrest may be inclined back.

The rope 27 stretched between the retract unit 2 and the motor 3 can be also stretched between the retreating unit 2 and a brake pedal 6 instead of the motor 3. Then in case of an urgent stepping the brake pedal 6 can permit the retract unit 2 function in the same way.

While the preferred embodiments of the invention have been described above, it will be recognized and understood that various modifications may be made therein and the appended claims are intended to cover all such modifications which may fall within the spirit and scope of the invention.

What is claimed is:

1. An automobile safety belt device comprising:
   a belt housing being fixed on a post in an automobile and containing some length of a safety belt and one end of said safety belt;
   a fixing member being fixed with an outer end of said safety belt and mounted on a rear portion of a seat side;
   a retaining member mounted on a wall near said belt housing, having a slot for said safety belt to pass through freely;
   a hook movably combined on said safety belt to be locked in a hook retainer mounted on a rear portion of said seat side opposite to said fixing member;
   a retract unit having two fixing wheels arranged in a vertical direction, an adjusting wheel beside and between said two fixing wheels, a passageway formed between said two fixing wheels and said adjusting wheel for said safety belt to pass through, a double bent connecting rod having each end fixed with one end of a respective coil spring, the other end of each respective coil spring being hooked on an inner wall of a housing of said retract unit, said adjusting wheel having its center fixed on the middle of said connecting rod and said adjusting wheel being connected to a motor through a rope, a stop block fixed on a lower end of said connecting rod;
   said motor rotating to pull said rope, said adjusting wheel and said connecting rod in said retract unit when activated by a plurality of automatic sensors;
   said plurality of automatic sensors mounted spaced apart on a front and a rear bumper for sensing a shock and then functioning to activate said motor; and,
   said safety belt being pinched immovable between said adjusting wheel and said two fixing wheels in said retract unit when said adjusting wheel is pulled by said rope when said motor is activated by any of the plurality of said automatic sensors sensing a shock.

2. The automatic safety belt device as claimed in claim 1, wherein said belt housing is mounted in a vertical side of a brackrest, and said retaining member is set on the same vertical side of said bracket.

3. The automobile safety belt device as claimed in claim 1, wherein said rope of said retract unit is connected with a brake pedal of an automobile.

* * * * *